Nov. 6, 1945.  J. HENDERSON  2,388,541
METHOD OF MANUFACTURING LAMINATED ARTICLES
FROM VENEER OR LIKE SHEET MATERIAL
Filed Nov. 27, 1943  2 Sheets-Sheet 1
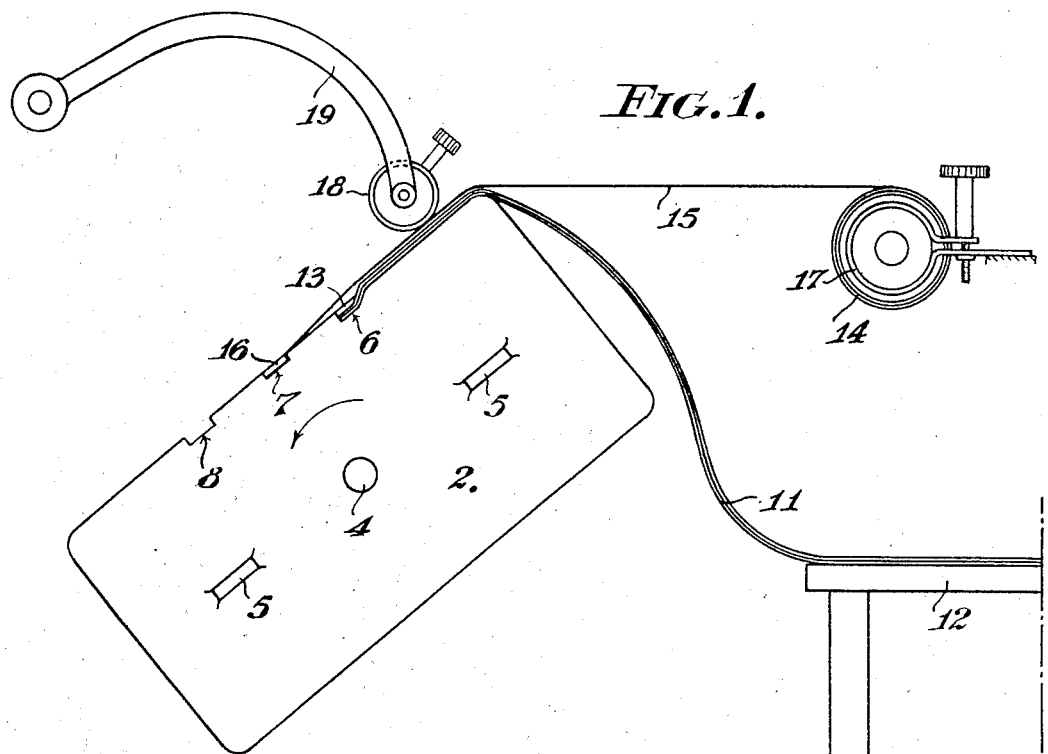
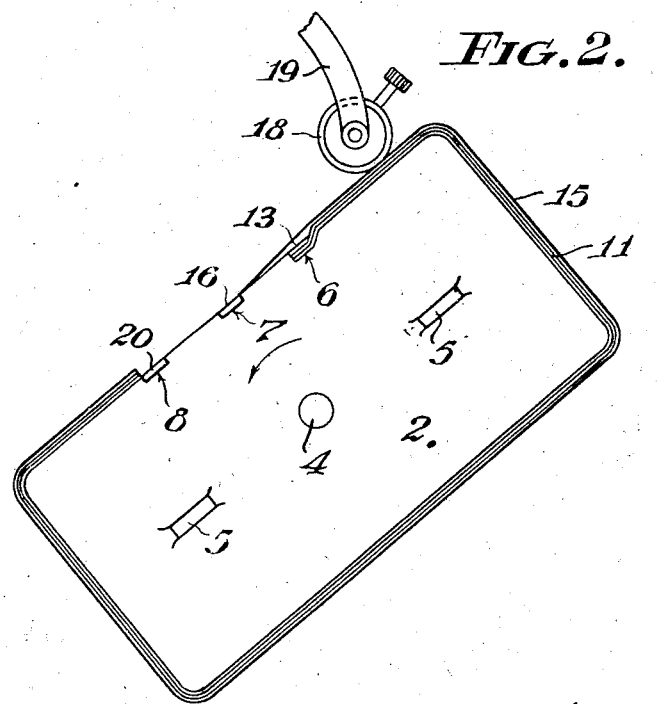
INVENTOR
JAMES HENDERSON
By Wilhauster&Groff
Attys Nov. 6, 1945. J. HENDERSON 2,388,541
METHOD OF MANUFACTURING LAMINATED ARTICLES
FROM VENEER OR LIKE SHEET MATERIAL
Filed Nov. 27, 1943   2 Sheets-Sheet 2

INVENTOR,
JAMES HENDERSON

Patented Nov. 6, 1945

2,388,541

UNITED STATES PATENT OFFICE 2,388,541

METHOD OF MANUFACTURING LAMINATED ARTICLES FROM VENEER OR LIKE SHEET MATERIAL

James Henderson, Kinghorn, Fife, Scotland

Application November 27, 1943, Serial No. 511,992
In Great Britain December 2, 1942

5 Claims. (Cl. 144—309)

This invention relates to a method of manufacturing articles from veneers or other suitable sheet material, arranged in laminated form with the laminae adhered together, and more particularly to the manufacture of hollow bodies such as, for example, boxes, wardrobes, cabinets and various forms of furniture and containers, aircraft fuselages and hollow parts of aircraft and other vehicles.

The chief object of the present invention is to provide a method of manufacturing laminated hollow bodies from veneer or like sheet material, for example kraft paper or board impregnated with a synthetic resin, or a mixture of wood veneer and such impregnated sheet material, which obviates the necessity for pinning the sheet material piecemeal upon a permanent frame and also which reduces the requisite operations to a minimum. Another object of this invention is to enable large quantities of articles to be manufactured cheaply yet effectively and to uniform dimensions without the necessity for skilled labour.

According to this invention, a method of manufacturing articles such as those herein exemplified and analogous products, consists in providing a mould or former of the shape of the contemplated body, wrapping about the perimeter of such mould or former a plurality of disunited sheets or tapes of the veneer or the like to produce a laminated assembly of the sheets or tapes, each sheet or tape being continuous for the whole of the desired perimetrical dimension of the mould or former to be covered, incorporating with or applying to said sheets or tapes an adhesive medium to firmly unite the successive layers into a solid wall, applying external pressure to the laminated sheets or tapes by an external tensioned covering of soft flexible sheet material totally covering the laminated sheets or tapes whilst they are wrapped about the mould or former whilst the adhesive medium is activated, supplementing said pressure by additional pressure producing means until the adhesive medium has set hard, and thereupon removing the resultant laminated hollow body from the mould or former.

In the production of articles such as cabinets, wardrobes, boxes and the like, which are the types of articles to be produced by the present invention, the ends, or the top and base, of the article can be applied before removal of the mould or former provided the mould or former can be disassembled and removed through, for example, a door or lid opening, or if desired one end, or the top or bottom can be left open for the removal of the mould or former.

The said supplementing of the pressure until the adhesive medium is set hard can be effected by suitable pressing or clamping apparatus, for example external pressure applied by presses or clamps, the preferred method consisting in clamping the wrapped work between suitable plates or blocks and leaving the work thus clamped until the adhesive between the laminae of veneer has set. The shaped article is then freed from the clamps and the mould or former and the fabric wrapping removed. The work is then finally dried or weathered upon a frame suitably shaped to prevent distortion of the work.

In order that the invention may be clearly understood and readily carried into effect, drawings are appended hereto illustrating an embodiment thereof, and wherein:

Figure 1 is a diagrammatic side elevation view showing a method suitable for use in the production of wardrobe, cabinet box and like carcases, this figure showing the initial stages of the operation;

Figures 2 and 3 are views similar to Figure 1 with the exception that they show respectively the completion of the wrapping operation and the subsequent pressing operation.

Figure 4:
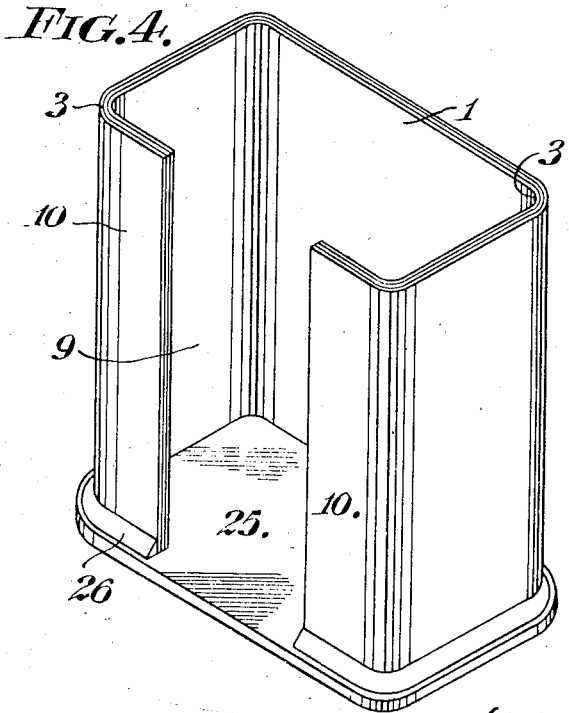
Figure 4 is a detail perspective view showing by way of example one form of work which can be produced by the method illustrated by Figures 1, 2 and 3.

Referring to the drawings, the contemplated product is a wardrobe or like article to be fitted with a door, and the part of such an article produced by the present method is a seamless or jointless body part 1 (see Figure 4) composed of thick plywood, for example five or more plies. For this purpose a former 2, preferably of wood, is prepared having a length greater than the finished height of the body part 1 and sides dimensioned to correspond with the predetermined widths of the walls of the body 1. Its corners can be radiused to produce attractive bowed or narrowly curved corners 3 on the body 1.

The former 2 is mounted upon a shaft 4 having a reduction gear connection to a suitable prime mover and adapted to be rotated slowly in the direction of the arrow. Lugs 5 can be provided on the former for locking it to a rotary frame fixed to the shaft 4. Three longitudinal rebates 6, 7 and 8 are formed along one face of the former 2 and when the contemplated product is to have a door opening 9 these rebates will be positioned between the predetermined positions of the front wall portions 10.

A set of veneers 11 is prepared by coating or impregnating them with any suitably highly tenacious and preferably strengthening adhesive which can be a thermoplastic or thermosetting cement, and the adhesive can be either cold, such as casein or urea-formaldehyde, or hot, such as phenol resins. The veneers 11 are individually free and supported on a bench 12 as a stack, their number depending upon the desired thickness of the wall of the finished article. One end of this set of veneers is securely held by a clamp 13 in the rebate 6 or may be secured by nails.

A reel 14 supported for rotation above the bench 12 has wound upon it a length of fabric 15, the same width as the width of the stack of veneers 11, and one end of this length of fabric is fastened in the rebate 7 by a clamp 16. A band brake 17 or other suitable adjustable friction device yieldingly opposes unwinding of the fabric 15 from the reel 14 under the tension due to the rotation of the former 2. The fabric 15 is drawn at high tension against the outermost layer of the set of veneers 11, with the result that as each side of the former 2 moves into and away from its uppermost horizontal position, the layers of veneers are pressed tightly against the former 2 by the tensioned fabric, and as the adhesive which is to unite the laminae of veneers together is activated at this stage the preliminary stage of laminating takes place. This bandaging or wrapping action of the fabric 15 upon the plywood is supplemented by the pressure of a smoothing and pressure-distributing device in the form of a roller 18, preferably covered with rubber, this roller assisting adhesion of the layers by breaking down any air pockets and by imparting a slight rubbing movement to the layers relatively to each other. This roller is carried by arms 19 suitably loaded to apply the desired pressure and adapted to be moved to swing the roller 18 away from the work when necessary. The outermost layer of the veneers 11 can be the ornamental outer covering of the finished article, and it is not coated externally with an adhesive. If desired the fabric 15 can be shrunk on to the work after it has been applied about the work.

The trailing end of the set of veneers 11 can terminate in the rebate 8 or slightly short of such rebate at the completion of one rotation of the former 2, and it is preferred to repeat this rotation to obtain a double wrapping of the fabric about the work, and thereupon the fabric is secured by a clamp 20 in the rebate 8 or other convenient part and then severed from the loose trailing remainder thereof extending from the reel 14. Instead of the roller 18, a scraper can be employed, adapted to have a squeegee action.

Figure 3:
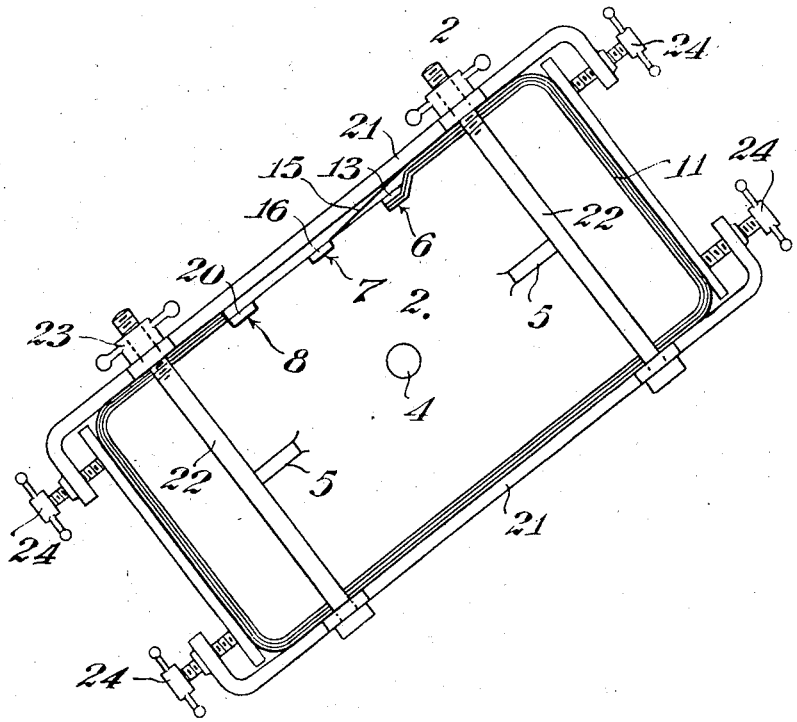

When the fabric wrapping has been secured under tension about the work, clamps are applied, for example rigid metal plates (Fig. 3) urged by screws 22 and nuts 23, and set screws 24, against the sides of the work. These clamps are used to apply moderate pressure to the work, and are kept in position for as long as may be required after the former has been removed from the mechanism for rotating it, to ensure complete binding together of the laminae of veneers and proper drying of the adhesive, following which stage in the operation, the work is removed from the former and may be supported on a frame for weathering and final drying. In due course the edges of the work can be trimmed and the top and bottom members applied together with such cornicing or ornamentation as may be appropriate as for example the base board 25 and surrounding cornice 26 shown in Figure 4.

The foregoing method is suitable for use with a cold adhesive.

Instead of a wooden former 2 a hollow metal one may be used and after it has been removed from the rotating mechanism connected to a supply of steam, at a temperature suited to the adhesive used. The heat and pressure of the steam will cause the former to swell, giving sufficient pressure within the clamps for any type of adhesive. Either thermoplastic or thermosetting cements may be used, and film types of adhesives are suitable.

After setting, the plywood is cooled on the former. If a very hot adhesive is used, it may be necessary to restore the moisture content of the timber. The top and bottom are then inserted as described above. The method using cold adhesives is cheaper in outlay, but production by hot method is much quicker.

The methods described above are suitable for producing such articles as wardrobes, tallboys, carcases of chests of drawers, etc. where there is an opening required. Articles having no opening may be produced by the same means. For example, drawers may be produced by making up the veneers in two layers, one long grain and one short grain; this is wound on endlessly, pressure being applied by the squeegee only, till the required thickness is built up, after which the fabric is applied and the process is completed as above. After removal from the former the plywood so formed is sliced up into the desired breadths for drawer work.

It will be appreciated that all of the layers of veneer are applied simultaneously and during their application the individual layers are free to adapt themselves to the corners and contours they have to negotiate so that the strains and distortions on the layers are uniformly distributed, which would not be possible if the plywood were in a finished state before being applied about the former.

I claim:

1. A method of manufacturing cabinets, boxes, wardrobes and the like consisting in winding disunited layers of veneer or the like treated with an adhesive upon a rotating former and subjecting them to roller pressure as they are tensioned about the rotating former simultaneously with the tensioned wrapping upon the layers of veneer or the like of a bandage of soft flexible material, maintaining the tensional wrapping action of the bandage subsequent to the complete bandaging of the work and supplementing the pressure due to such tensional wrapping by pressure applied to substantially the whole of the bandaged layers.

2. A method of manufacturing cabinets, boxes, wardrobes and the like consisting in winding disunited layers of veneer or the like treated with an adhesive upon a rotating former and subjecting them to roller pressure as they are tensioned about the rotating former simultaneously with the tensioned wrapping upon the layers of veneer or the like of a bandage of soft flexible material, maintaining the tensioned wrapping action of the bandage subsequent to the complete bandaging of the work and supplementing the pressure due to such tensional wrapping by clamping the bandaged layers within clamping means disposed about the perimeter of the bandaged layers.

3. A method of manufacturing cabinets, boxes, wardrobes and the like consisting in winding disunited layers of veneer or the like treated with an adhesive upon a rotating former and subjecting them to roller pressure as they are tensioned about the rotating former simultaneously with the tensioned wrapping upon the layers of veneer or the like of a bandage of soft flexible material, maintaining the tensioned wrapping action of the bandage subsequent to the complete bandaging of the work and supplementing the pressure due to such tensional wrapping by fluid pressure and heat applied internally to the former.

4. A method of manufacturing hollow rectangular bodies comprising treating disunited layers of veneer or the like with an adhesive medium and firmly anchoring them at one end to the perimeter of a former and also one end of a length of fabric being anchored to the former so as to overlap the anchored end of the set of veneers or the like, the veneers or the like and the fabric thereafter being wrapped simultaneously closed about the former and simultaneously subjected to rolling pressure so that the set of veneers or the like is pressed flush against the former by the tension of the fabric and the rolling action, the wrapping of the fabric being continued beyond the trailing end of the set of veneers or the like and fastened about the work to maintain the work in close contact with the former, the tensioned wrapping thereafter being maintained upon the work while subjecting substantially the whole of the work to additional pressure.

5. A method of manufacturing hollow bodies comprising treating disunited layers of veneer or the like with an adhesive medium and firmly anchoring them at one end to the perimeter of a former and also one end of a length of fabric being anchored to the former so as to overlap the anchored end of the set of veneers or the like, the veneers or the like and the fabric thereafter being wrapped simultaneously closely about the former and simultaneously subjected to rolling pressure so that the set of veneers or the like is pressed flush against the mould or former by the tension of the fabric and the rolling action, the wrapping of the fabric being continued beyond the trailing end of the set of veneers or the like and fastened about the work to maintain the work in close contact with the former, external pressure being applied thereafter to substantially the whole of the external surface of the work while the work is maintained on the former by the tensioned wrapping.

JAMES HENDERSON.